United States Patent
Inuzuka

(10) Patent No.: US 9,531,221 B2
(45) Date of Patent: Dec. 27, 2016

(54) LOCKING STRUCTURE FOR STATOR CORE

(71) Applicant: Nissan Motor Co., Ltd., Kanagawa (JP)

(72) Inventor: Kenta Inuzuka, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 317 days.

(21) Appl. No.: 14/381,233

(22) PCT Filed: Feb. 26, 2013

(86) PCT No.: PCT/JP2013/054889
§ 371 (c)(1),
(2) Date: Aug. 27, 2014

(87) PCT Pub. No.: WO2013/129372
PCT Pub. Date: Sep. 6, 2013

(65) Prior Publication Data
US 2015/0333576 A1 Nov. 19, 2015

(30) Foreign Application Priority Data
Feb. 27, 2012 (JP) .................................. 2012-040264

(51) Int. Cl.
*H02K 1/18* (2006.01)
*H02K 1/14* (2006.01)

(52) U.S. Cl.
CPC .............. *H02K 1/148* (2013.01); *H02K 1/185* (2013.01)

(58) Field of Classification Search
CPC ............ H02K 1/18; H02K 1/185; H02K 1/14; H02K 1/148; H02K 1/16; H02K 5/24; H02K 15/14

USPC .................................................. 310/91, 431
See application file for complete search history.

(56) References Cited

U.S. PATENT DOCUMENTS

| 2,424,299 A | * | 7/1947 | Baudry | H02K 1/185 310/216.124 |
| 2,478,551 A | * | 8/1949 | Turner | H02K 1/185 310/216.127 |
| 3,867,654 A | * | 2/1975 | Otto | H02K 5/04 310/216.132 |
| 4,241,274 A | * | 12/1980 | Brammerlo | H02K 1/16 310/179 |

(Continued)

FOREIGN PATENT DOCUMENTS

DE 202008015575 U1 4/2010
JP 50-82303 B2 7/1975

(Continued)

OTHER PUBLICATIONS

International Search Report for corresponding International Application No. PCT/JP2013/054889, mailed Jun. 4, 2013 (7 pages).

(Continued)

*Primary Examiner* — Tran Nguyen
(74) *Attorney, Agent, or Firm* — Osha Liang LLP

(57) ABSTRACT

A locking structure for a stator core that locks the stator core having a circular outer circumference into an inner circumference of a cylindrical housing includes a first cut-out formed in an outer circumference of the stator core and a second cut-out formed in an inner circumference of the housing. The locking structure also includes a key interposed between the first and second cut-outs.

7 Claims, 17 Drawing Sheets

(56) References Cited

U.S. PATENT DOCUMENTS 6,144,129 A * 11/2000 Fuller ..................... F16F 1/185
310/171

FOREIGN PATENT DOCUMENTS

JP           5-15647 U    2/1993
JP     2010-233328 A    10/2010

OTHER PUBLICATIONS

Written Opinion for corresponding International Application No. PCT/JP2013/054889, mailed Jun. 4, 2013 (3 pages).
International Preliminary Report on Patentability for corresponding International Application No. PCT/JP2013/054889, mailed Jun. 4, 2014 (9 pages).

* cited by examiner

SPRING FORCE

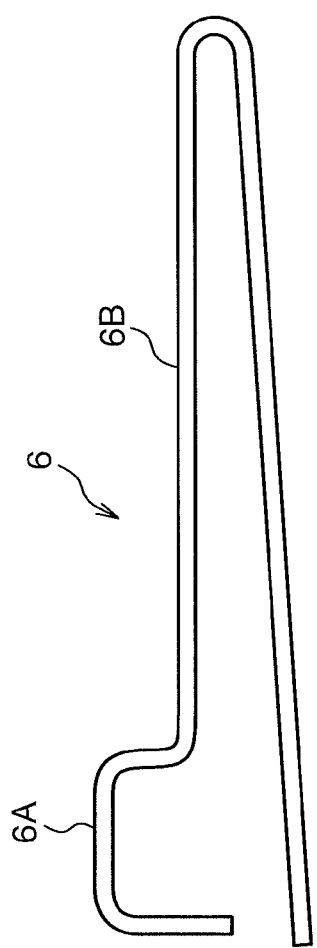
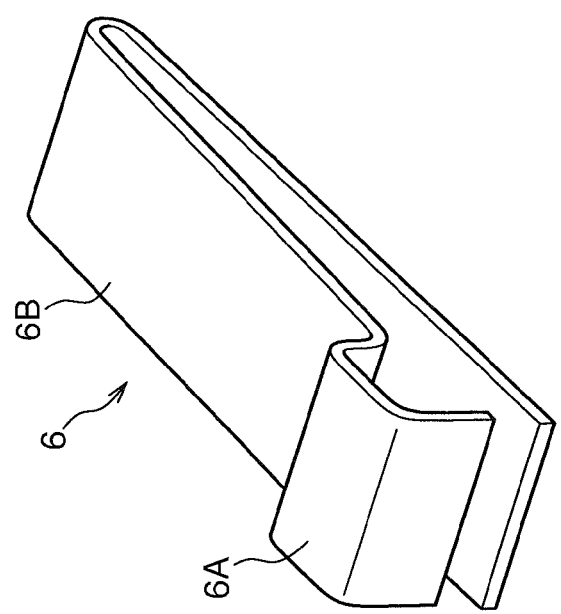
FIG. 6B
FIG6A

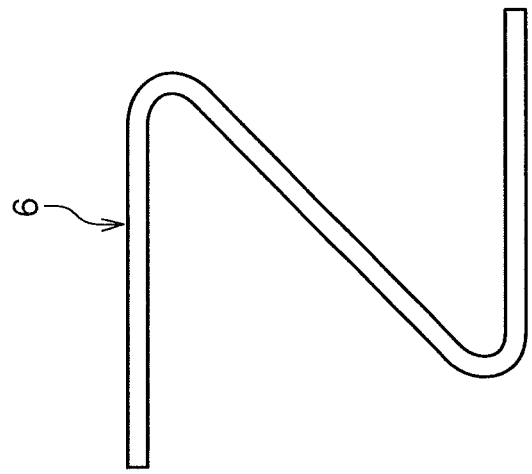
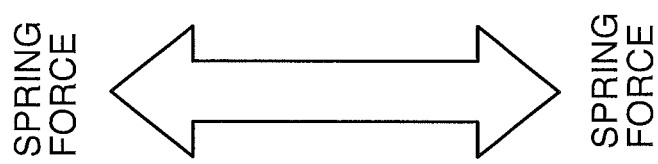
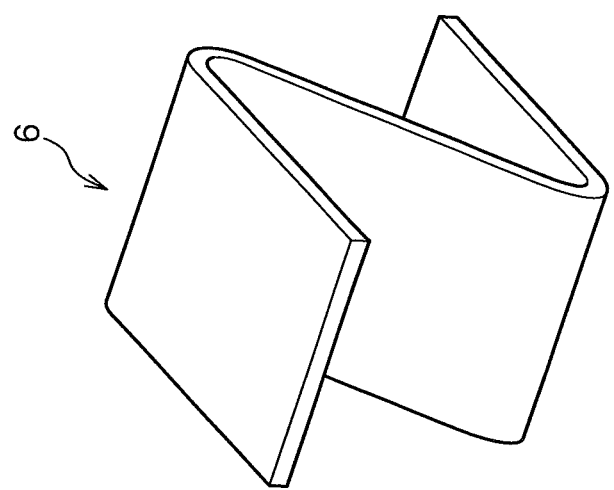
FIG. 8A          FIG. 8B

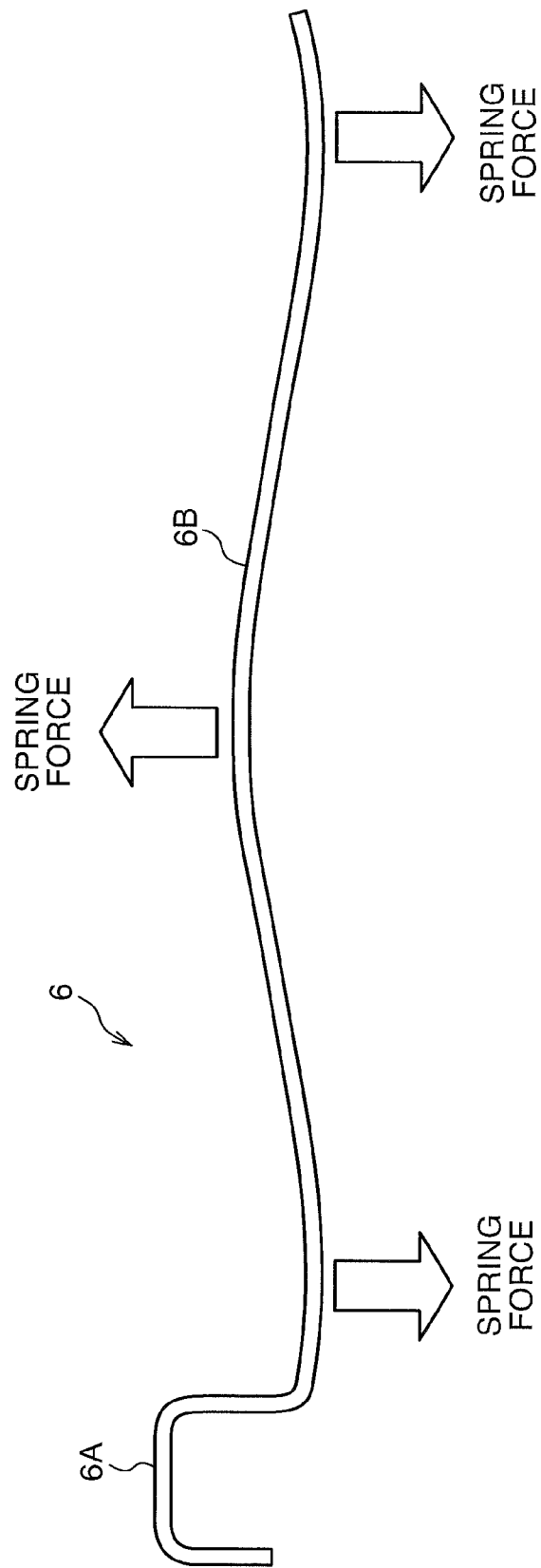

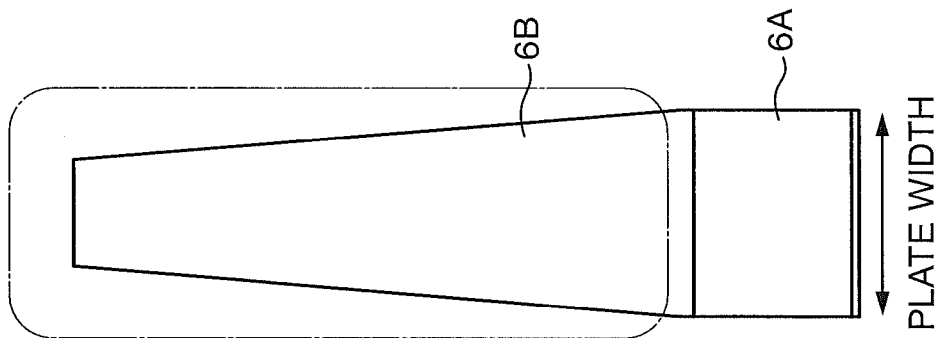
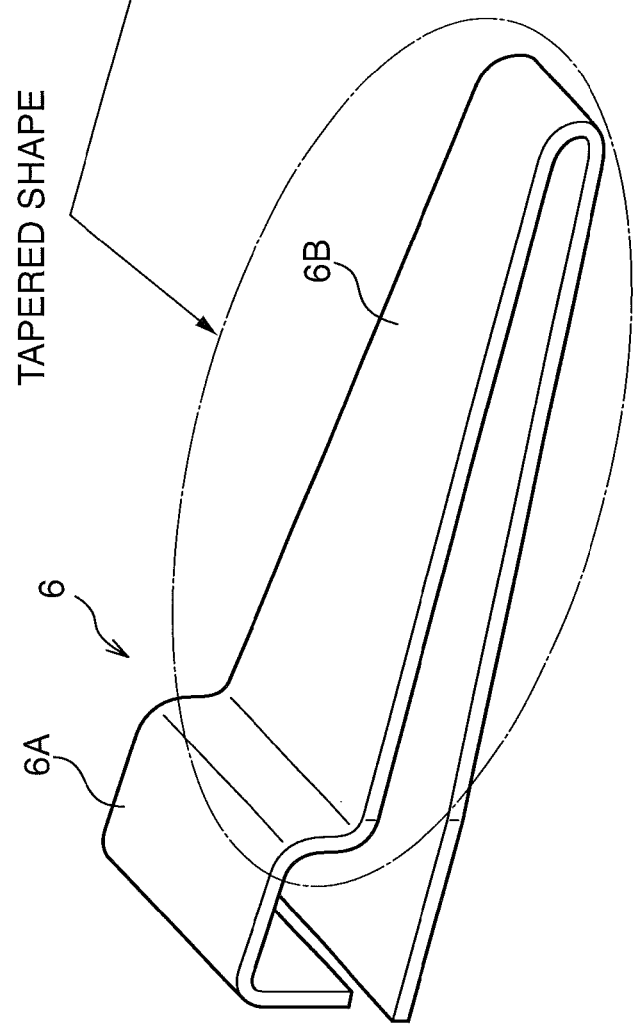
FIG. 11B
FIG. 11A

LOCKING STRUCTURE FOR STATOR CORE

CROSS-REFERENCE TO RELATED APPLICATIONS

This application is a National Stage application of International Patent Application No. PCT/JP2013/054889, filed on Feb. 26, 2013, which claims priority to Japanese Patent Application No. 2012-040264, filed on Feb. 27, 2012. Both International Patent Application No. PCT/JP2013/054889 and Japanese Patent Application No. 2012-040264 are hereby incorporated by reference in their entirety.

TECHNICAL FIELD

This invention relates to a structure of locking a stator core to a housing used in an electric motor or a generator.

BACKGROUND ART

A stator of an electric motor and the like is locked to a casing, for example, by arranging a plurality of unit cores corresponding to teeth, which are coil winding object, along a periphery and inserting a key into a key hole constituted by a key groove formed in an outer circumference of a single specific unit core and a key groove formed in the casing.

In the unit core, teeth are formed in the inner circumference, and a yoke is formed in the outer circumference. In addition, the key groove is further formed in the outer circumference of the specific unit core.

As the key is inserted into the key hole, a plurality of unit cores are locked to the casing in a contracted state by virtue of a so-called interference fit, so that the stator core is integrated with the casing.

In this state, the key prevents a relative displacement between the stator core and the casing in a rotation direction.

It is necessary to prevent the key from falling off the key groove. For this purpose, JU H05-015647 A, published by the Japan Patent Office in 1993, proposes a method of press-fitting a tapered pin into the key hole.

SUMMARY OF INVENTION

In the method of press-fitting the tapered pin into the key hole, the key grooves forming the key hole may be deformed or broken down due to a wedge effect of the tapered pin. In addition, if only the tapered pin is used, it is difficult to obtain a sufficient key length capable of tolerating a shearing force applied to the key caused by a relative displacement between the stator core and the casing in the rotation direction. Therefore, it is necessary to form a straight portion in addition to the tapered portion in the key. As a result, a necessary key length increases, and a manufacturing cost also increases.

It is therefore an object of this invention to reduce a stress that occurs in the key grooves when the key is inserted into the key hole.

In order to achieve the above object, this invention provides a locking structure that locks the stator core having a circular outer circumference into an inner circumference of a cylindrical housing. The locking structure comprises a first cut-out formed in the outer circumference of the stator core, a second cut-out formed in the inner circumference of the housing, and a key interposed between the first and second cut-outs. The key comprises a plate spring that applies a spring force to at least one of the first and second cut-outs.

The details as well as other features and advantages of this invention are set forth in the remainder of the specification and are shown in the accompanying drawings.

BRIEF DESCRIPTION OF DRAWINGS

FIGS. 6A and 6B are a perspective view and a longitudinal sectional view of a key according to a second embodiment of this invention;

FIGS. 8A and 8B are a perspective view and a longitudinal sectional view of essential parts of a key according to a third embodiment of this invention;

FIG. 9 is a longitudinal sectional view of a key according to a fourth embodiment of this invention;

FIGS. 11A and 11B are a perspective view and a plan view of a key according to a sixth embodiment of this invention;

DESCRIPTION OF EMBODIMENTS

Figure 1:
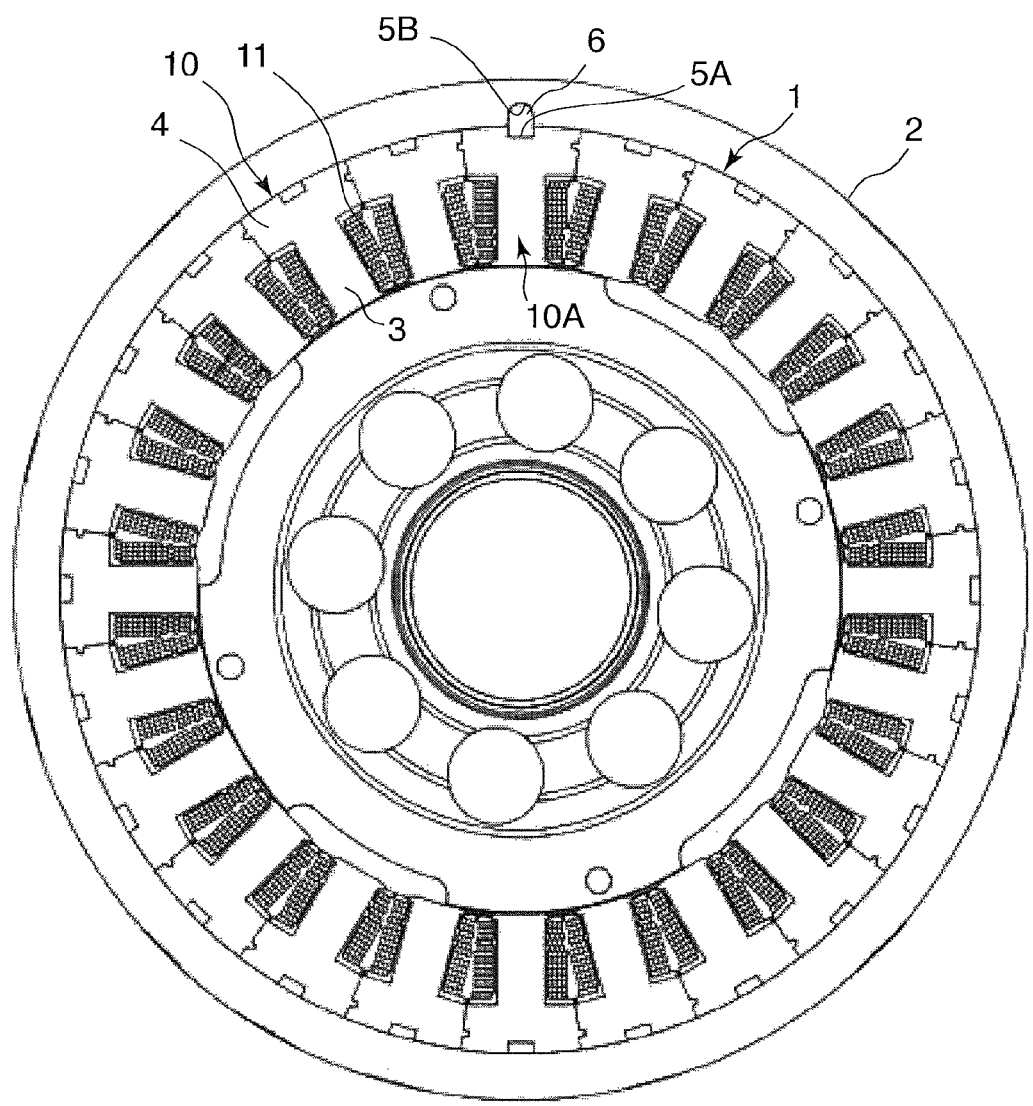
FIG. 1 is a cross-sectional view of a locking structure for locking a stator core to a housing according to a first embodiment of this invention.

Referring to FIG. 1 of the drawings, a stator core 1 according to a first embodiment of this invention fits into an inner circumference of a cylindrical housing 2 of an electric motor. The stator core 1 comprises a plurality of unit cores 10, each of which has a tooth 3, onto which a coil 11 is wound, and a yoke 4 that supports the tooth 3. A plurality of unit cores 10 are arranged around a periphery corresponding to an inner circumference of the housing 2 without a gap. A key groove 5A as a first cut-out is formed in an outer circumference of a single specific unit core 10A out of a plurality of unit cores 10. It is also preferable to form the key groove 5A in every unit core 10 as illustrated in FIG. 1 in order to standardize components. A second key groove 5B as a second cut-out is formed in an inner circumference of the housing 2.

The stator core 1 is fixed to the housing 2 by causing a first key groove 5A of a specific unit core 10A and a second key groove 5B of the housing 2 to confront each other and inserting a key 6 into a key hole formed by the key grooves 5A and 5B.

Figure 2B:
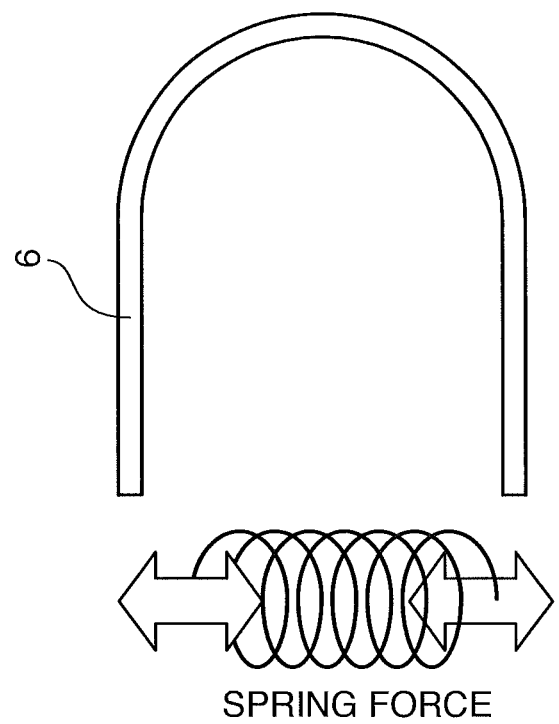
FIGS. 2A and 2B are a perspective view and a longitudinal sectional view of a key according to the first embodiment of this invention.
Figure 2A:
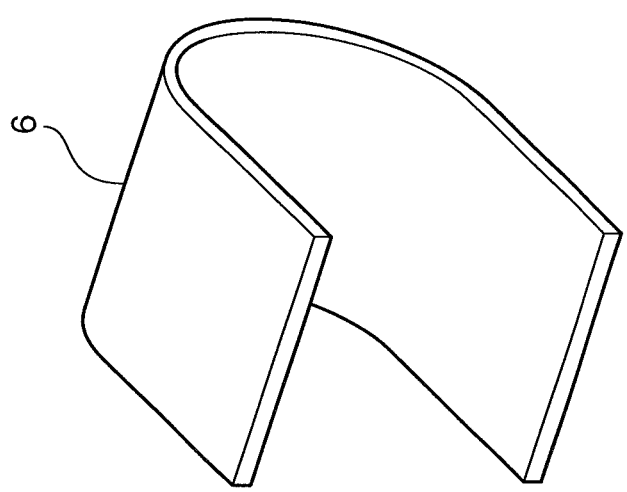

Referring to FIGS. 2A and 2B, the key 6 is constituted by a plate spring having a U-shaped longitudinal section. The key 6 is elastically deformed in a direction indicated by an arrow in FIG. 2B in response to an external force applied thereto. The plate spring is manufactured by curving a single metal plate in a U-shape.

Figure 3:
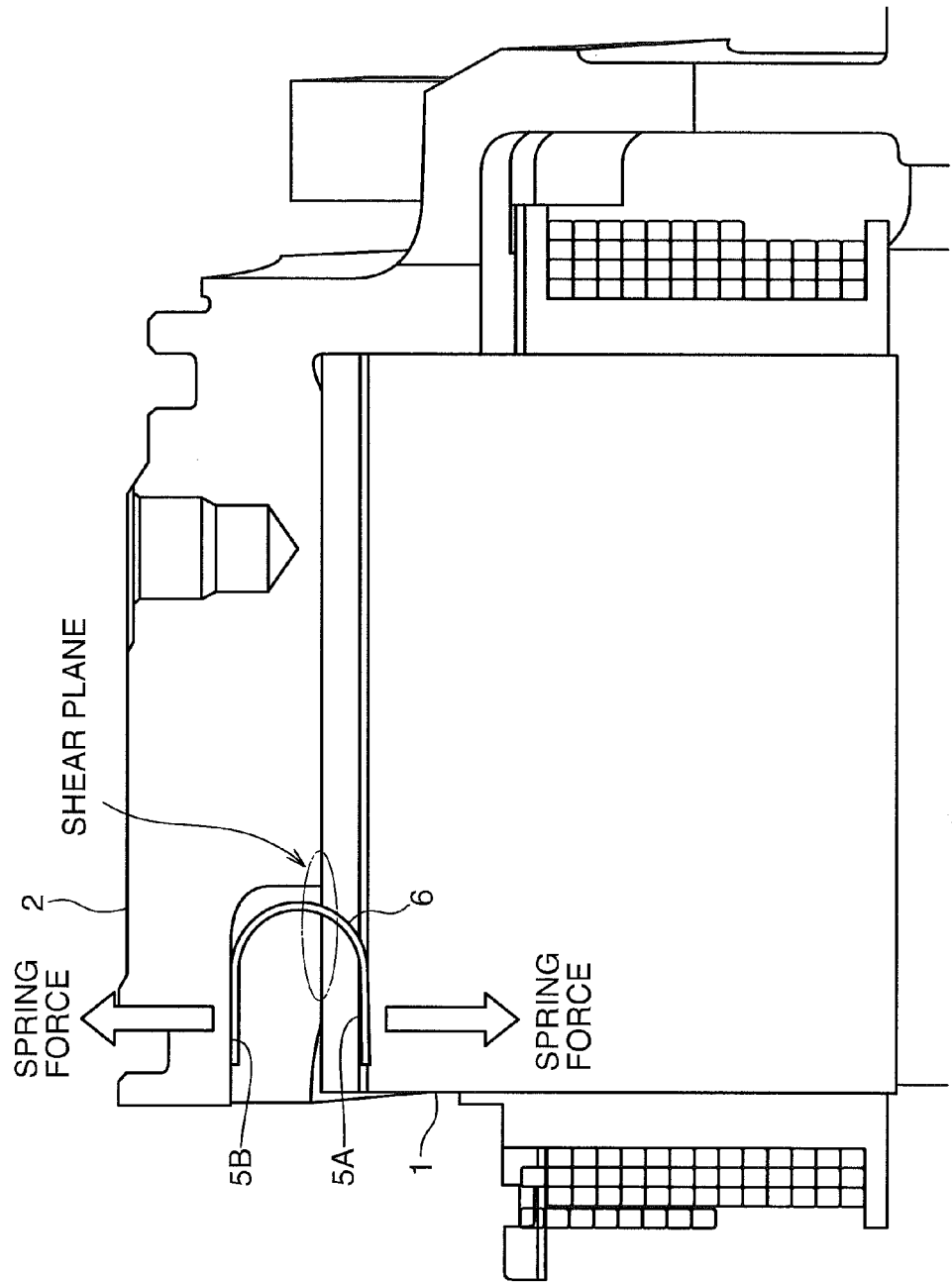
FIG. 3 is a longitudinal sectional view of a housing and the stator core illustrating a locking structure for locking the stator core to the housing.

Referring to FIG. 3, the key 6 made of the plate spring is inserted into a key hole formed by the key grooves 5A and 5B in a pressed and deformed state. The plate spring applies a spring force onto the bottom surfaces of the key grooves 5A and 5B as indicated by the arrows in the figure. The spring force serves as a holding force for preventing the key 6 from falling off the key grooves 5A and 5B. Further, when a load is applied such that a relative displacement between the stator core 1 and the housing 2 is promoted in a rotation direction, a shearing force acts on the portion of the key 6 surrounded by an ellipse in the figure. This shearing force is supported by a shearing resistance of the plate spring forming the key 6.

Figure 4:
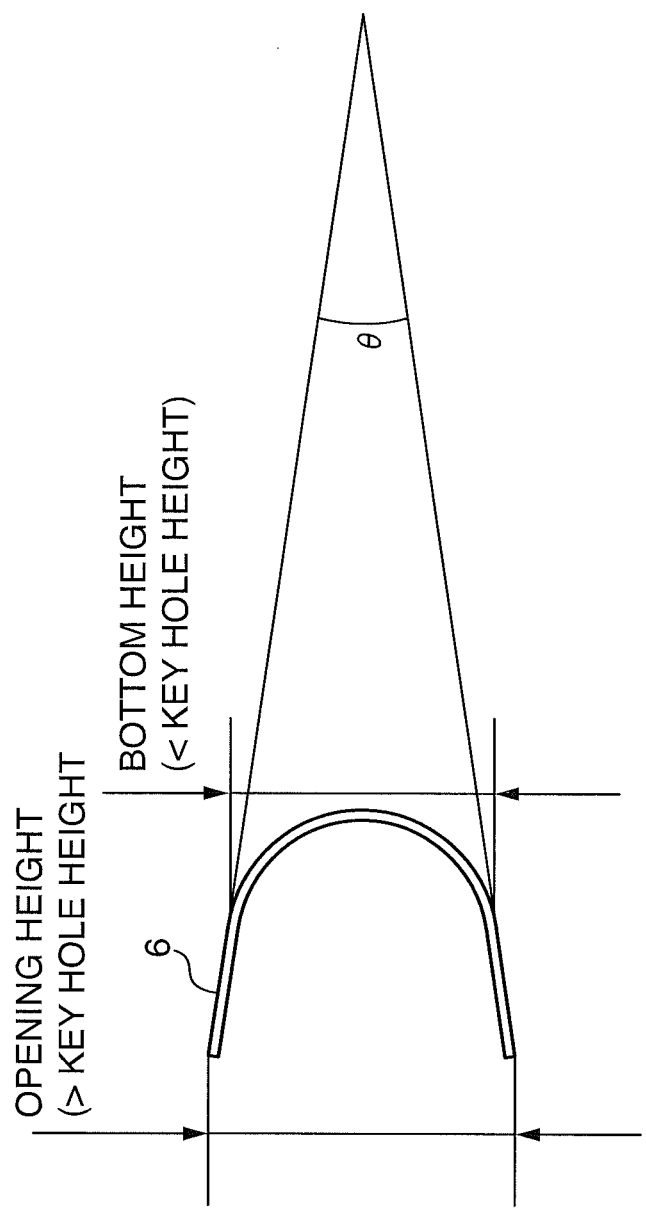
FIG. 4 is a longitudinal sectional view of the key for describing a dimension thereof.

Referring to FIG. 4, the key 6 is formed such that a longitudinal section of a curved portion, that is, a portion corresponding to a bottom of the U-shape, has a vertical dimension smaller than a gap between the bottom surfaces of the key grooves 5A and 5B. Meanwhile, the opposite end of the key 6, that is, a portion corresponding to an opening of the U-shape has a vertical dimension greater than the gap between the bottom surfaces of the key grooves 5A and 5B.

Figure 5B:
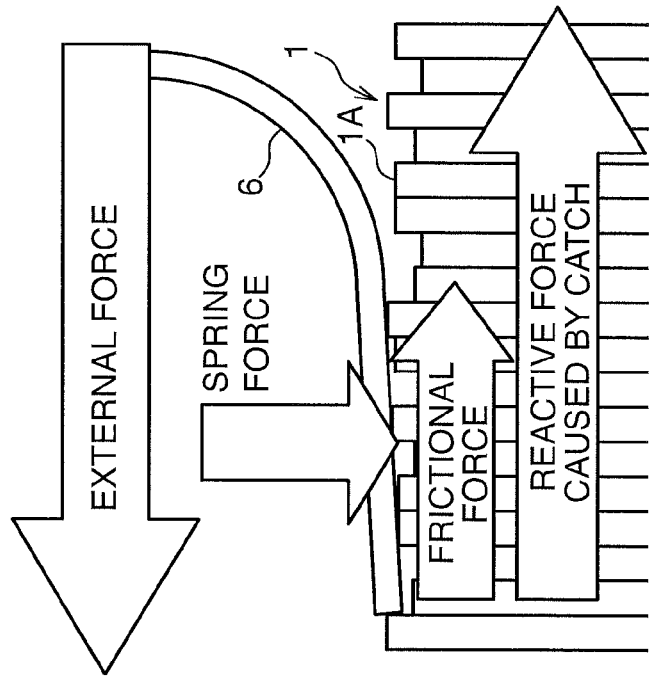
FIGS. 5A and 5B are a longitudinal sectional view of essential parts of the stator core and the housing illustrating a state where the key is inserted into the key grooves and a diagram describing a structure of a reaction force generation mechanism when an external force is applied to the key, according to the first embodiment of this invention.
Figure 5A:
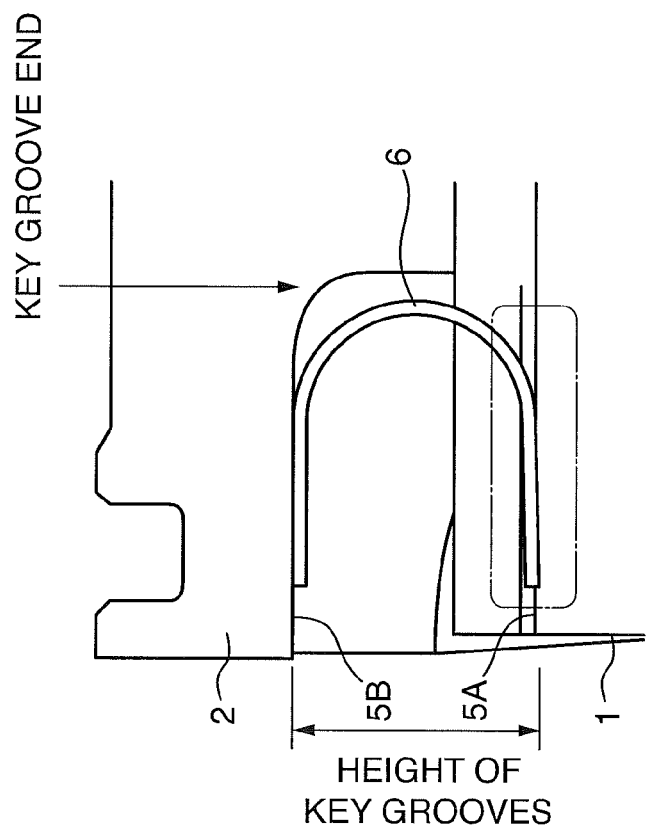

Referring to FIGS. 5A and 5B, a length of the key 6, that is, a dimension in a horizontal direction of FIG. 4 is set to be slightly shorter than the length of the key grooves 5A or 5B.

If the shape and the dimension are set as described above, the key 6 can be easily inserted into the key hole formed by the key grooves 5A and 5B after the stator core 1 is assembled with the housing 2. That is, as illustrated in FIG. 5A, by inserting the curved portion of the key 6 into the key hole formed by the key grooves 5A and 5B, the key 6 smoothly intrudes into the inside of the key hole by virtue of elastic deformation.

The key 6 inserted into the key hole applies a spring force to the bottom surfaces of the key grooves 5A and 5B. This spring force serves as a holding force for holding the key 6 in the key hole. That is, against a load that causes the key 6 to fall off the key hole, the spring force generates a frictional resistance between the key 6 and the bottom surfaces of the key grooves 5A and 5B to prevent the key 6 from moving inside the key hole. In addition, the key 6 inserted into the key hole formed by the key grooves 5A and 5B, without necessitating a special locking process, immediately serves as a rotation stop for stopping rotation of the stator core 1 with respect to the housing 2.

Since the key 6 is formed by the plate spring, a spring constant of the key 6 against a compressive force applied from the key grooves 5A and 5B to the key 6 is remarkably lowered compared to the case of a non-elastic key of the prior art. As a result, an excessive stress does not occur in the key grooves 5A and 5B even when a contact surface between the key 6 and the key grooves 5A and 5b is increased. Since the spring constant is low, that is, elastic deformation is easily generated by a compressive force, a stress occurring in the key 6 is also reduced.

In this locking structure, the key 6 is elastically deformed. Therefore, machining accuracy between the key 6 and the key grooves 5A and 5B can be lowered compared to the locking structure of the prior art. In addition, the key 6 can be formed from a single metal plate. Therefore, it is possible to reduce a machining cost of the key 6 or the key groves 5A and 5B.

When the stator core 1 is formed as a stack of electromagnetic steel sheets 1A as illustrated in FIG. 5B, and a load is applied to the key 6 inside the key grooves 5A and 5B such that the key is removed from the key grooves 5A and 5B, an opening end of the spring of the key 6 is caught by an unevenness of the stack of electromagnetic steel sheets 1A. Therefore, it is possible to obtain a reactive force that is greater than a frictional force obtained by the spring force applied between the key 6 and the key grooves 5A and 5B. That is, it is possible to reliably prevent the key 6 from falling off the key hole.

In other words, this locking structure presents high dimensional tolerance for the key 6 and the key grooves 5A and 5B. For example, when the dimension of the key grooves 5A and 5B is relatively large with respect to the specification matched with the key 6 and the spring force exerted on the key grooves 5A and 5B by the key 6 is weak, the key 6 does not fall off the key grooves 5A and 5B easily. Therefore, according to this locking structure, it is possible to lock the stator core 1 to the housing 2 easily and inexpensively.

Referring to FIGS. 6A, 6B, 7A and 7BA, a second embodiment of this invention will be described. According to this embodiment, the key 6 has a different shape from that of the first embodiment. The length of the first key groove 5A and that of the second key groove 5B are different from each other.

Referring to FIGS. 6A and 6B, the key 6 according to the second embodiment has a torque support portion 6A as illustrated in FIG. 6A on a surface facing the first key groove 5A formed in the housing 2. The torque support portion 6A is formed by bending an end of the key 6 facing the first key groove 5A to warp to the outer side. In the following description, a portion of the key 6 except for the torque support portion 6A will be referred to as a spring portion 6B.

A bending radius of the curved portion of the spring portion 6B of the key 6 is reduced as illustrated in FIG. 6B, compared to the first embodiment, in order to allow the spring portion 6B to intrude into a key hole formed by the inner circumferential surfaces of the first key groove 5B and the housing 2.

Figure 7B:
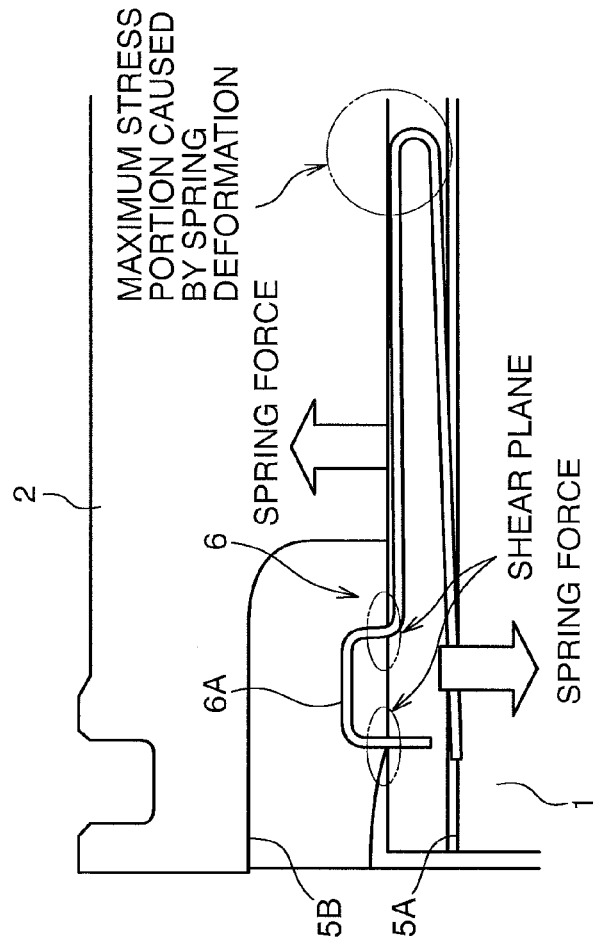
FIGS. 7A and 7B are a perspective view of essential parts of the stator core and the housing and an enlarged longitudinal sectional view of the same for illustrating a locked state by the key according to the second embodiment of this invention.
Figure 7A:
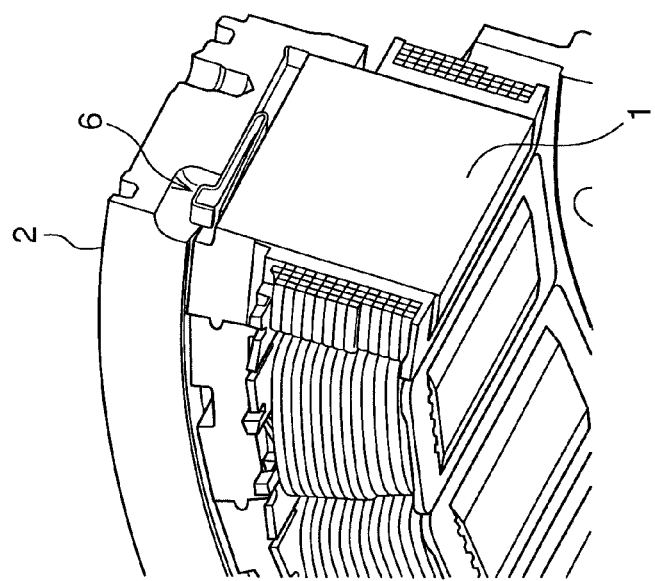

Referring to FIGS. 7A and 7B, according to this embodiment, the first key groove 5B of the stator core 1 is formed to be longer than the second key groove 5A of the housing 2 as illustrated in FIG. 7B.

As a result, while the stator core 1 is locked to the housing 2 using key 6 as illustrated in FIG. 7A, the spring portion 6B intrudes into the key hole formed by the inner circumferential surfaces of the housing 2 and the first key groove 5A in a place deeper than the key groove 5B as illustrated in FIG. 7B so that a spring force is applied to the key hole as indicated by the arrow in the drawing. This spring force serves as a holding force for preventing the key 6 from falling off the key hole.

Meanwhile, the torque support portion 6A of the key 6 is arranged in a space formed by the key grooves 5A and 5B across the key grooves 5A and 5B. According to this embodiment, if a load is applied such that a relative displacement is generated between the stator core 1 and the housing 2 in the rotation direction, a shearing force is applied in a portion of the key 6 surrounded by a pair of ellipses in the figure. The shearing force is supported by a shearing resistance of the plate spring in the same portion. That is, according to this embodiment, the number of portions where the shearing force is applied on the longitudinal cross section of the key 6 is two, which is greater than that of the first embodiment. Therefore, it is possible to obtain a stronger shearing resistance. In other words, according to this embodiment, it is possible to obtain a strong support force against the shearing force, compared to the first embodiment.

In this embodiment, the depths of the key grooves 5A and 5B are the same as those of the first embodiment whereas the lengths of the key grooves 5A and 5B are different from those of the first embodiment. For this reason, a work for machining the grooves is not significantly different from that of the first embodiment. According to the second embodiment, it is possible to reinforce a support force against the shearing force of the key 6 using a simple and easy structure.

In each of the embodiments described above, the longitudinal sectional shape of the key 6 is not limited to the U-shaped longitudinal section if it can apply a spring force to the stator core 1 and the housing 2. For example, as illustrated in FIGS. 8A and 8B as a third embodiment of this invention, the key 6 may have a Z-shaped longitudinal section. As illustrated in FIG. 9 as a fourth embodiment of this invention, a plate spring having a wavy longitudinal section may be applied to the key 6 instead of the plate spring having the U-shaped longitudinal section. In this case, as indicated by the arrow in the figure, an apex of the waveform is formed in the spring portion 6B of the key 6, so that a spring force is applied to the housing 2. In the valley of the waveform, a spring force is applied to the stator core 1.

Figure 10B:
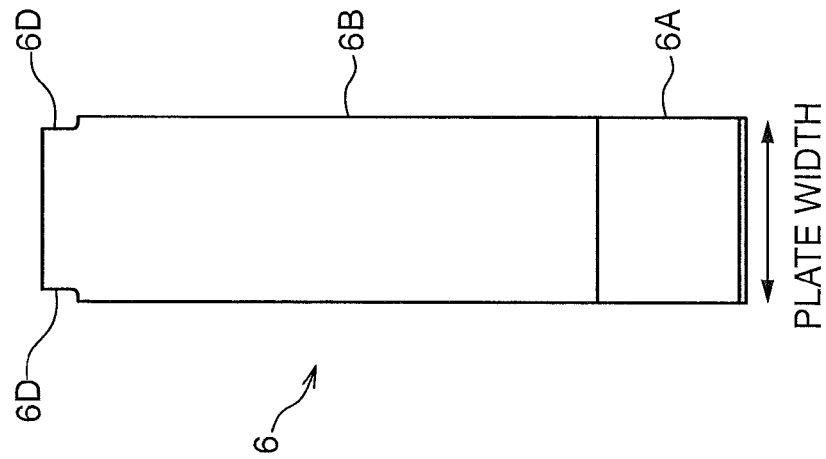
FIGS. 10A and 10B are a perspective view and a plan view of a key according to a fifth embodiment of this invention.
Figure 10A:
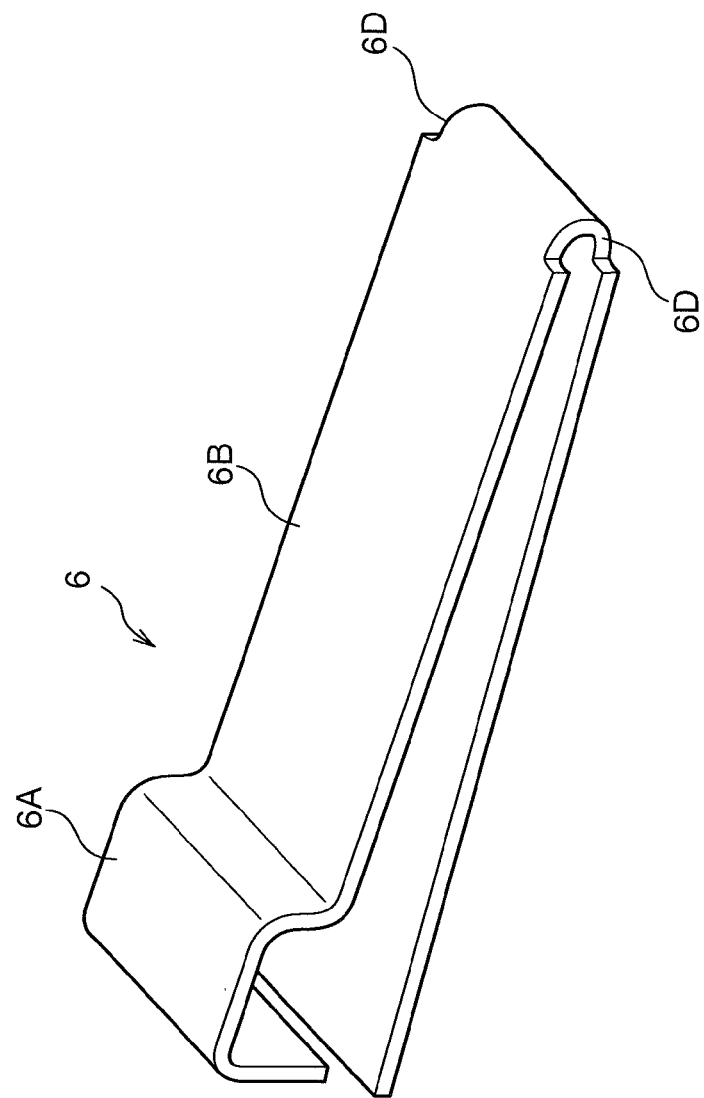

The width of the key 6 is not necessarily constant. For example, according to a fifth embodiment of this invention, as illustrated in FIGS. 10A and 10B, a cut-out 6D may be formed in the curved portion as necessary. Alternatively, according to a sixth embodiment of this invention, as illustrated in FIGS. 11A and 11B, the spring portion 6B of the key 6 may be formed in a tapered plane shape.

Figures 12A, 12B:
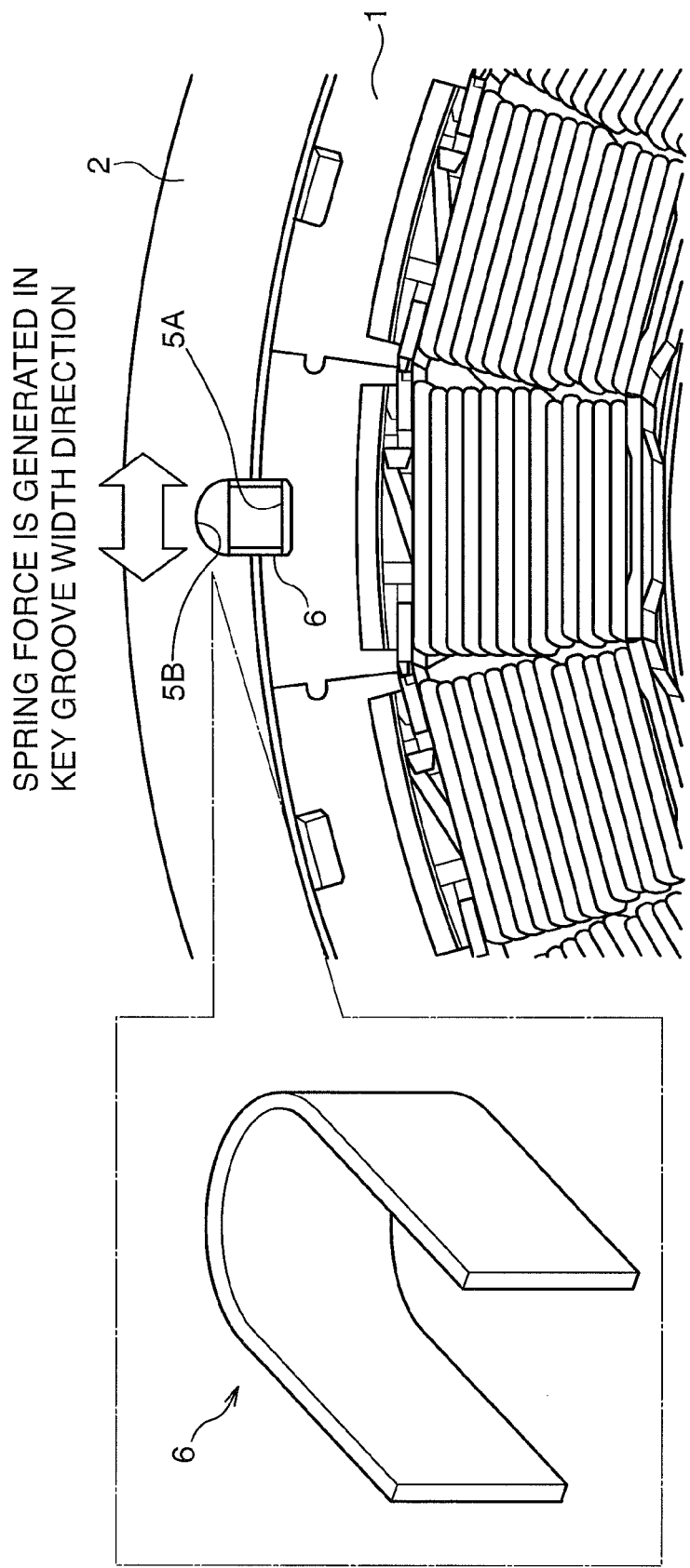
FIGS. 12A and 12B are a perspective view of a key and a front view of a locking portion between the stator core and the housing, according to a seventh embodiment of this invention.

Alternatively, one of the arms of the key 6 does not necessarily adjoin the stator core 1, and the other arm does not necessarily adjoin the housing 2. According to a seventh embodiment of this invention, as illustrated in FIGS. 12A and 12B, the key 6 may be inserted into the key grooves 5A and 5B in a state where it is rotated by 90°, compared to the first embodiment, in order to allow the key 6 to apply a spring force to a portion corresponding to side walls of the key grooves 5A and 5B.

Figure 13:
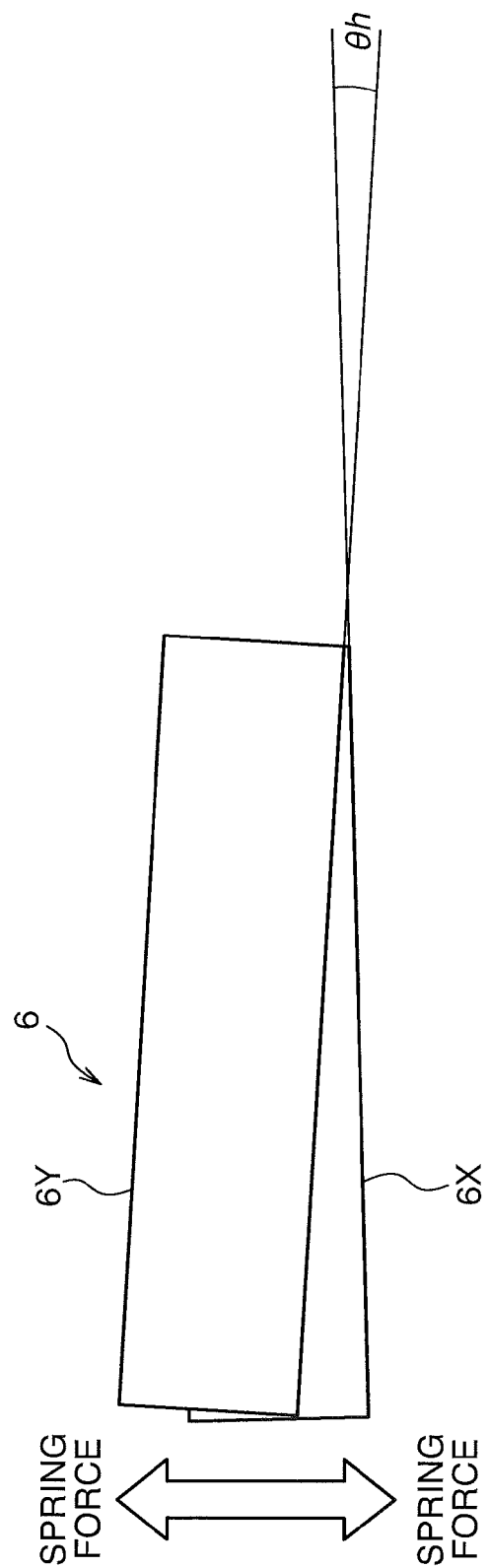
FIG. 13 is a plan view of a key according to an eighth embodiment of this invention.

In the first and second embodiments, the portion adjoining the stator core 1 and the portion adjoining the housing 2 overlap each other when the key 6 is seen from a spring force application direction. In contrast, according to an eighth embodiment of this invention, as illustrated in FIG. 13, the key 6 may be formed such that a leading ends are deviated from each other in the circumferential direction. That is, the key 6 is formed such that a first portion 6X facing the first key groove 5A of the stator core 1 and a second portion 6Y facing the second key groove 5B of the housing 2 have an intersecting angle θh with respect to a horizontal direction.

In this case, the key 6 inserted into the key grooves 5A and 5B can apply a spring force in a circumferential direction as well as a radial direction to a fitting surface between the housing 2 and the stator core 1 having circular cross section. If the key 6 has such a shape, a frictional resistance of the key 6 against the stator core 1 and the housing 2 increases, and a holding force of the key 6 to the hole formed by the key grooves 5A and 5B is reinforced.

Figure 14A:
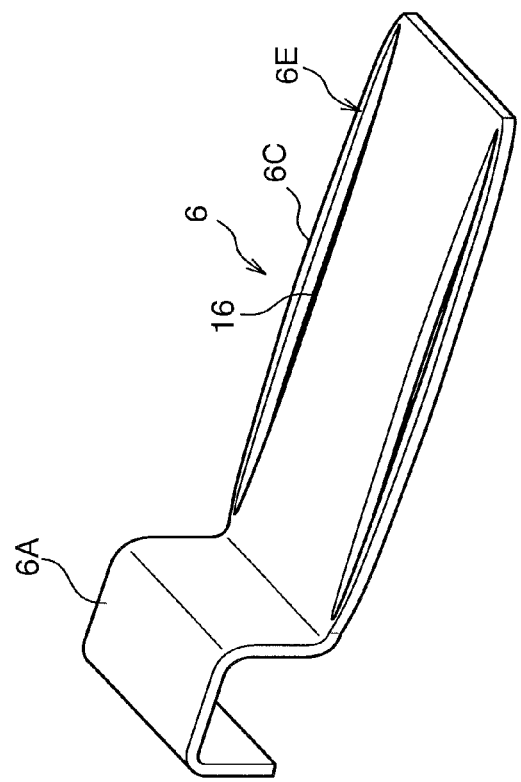
FIGS. 14A and 14B are a perspective view and a plan view of a key according to a ninth embodiment of this invention.
Figure 14B:
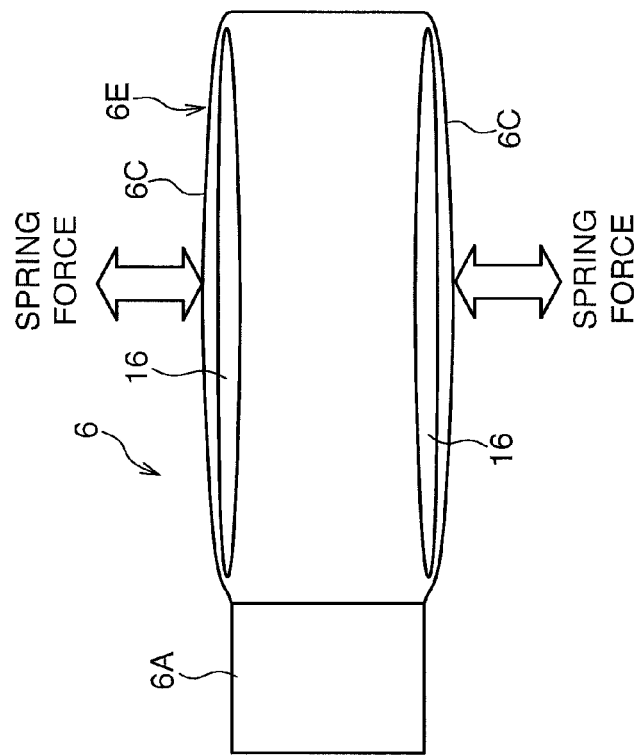

Referring to FIGS. 14A and 14B, a ninth embodiment of this invention will be described. According to this embodiment, instead of the spring portion 6B curved into a U-shaped longitudinal section, a bulge 6C having a slit 16 is formed in a lateral side of the spring portion 6E. The shape of the torque support portion 6A is similar to that of the second embodiment. According to this embodiment, if the key 6 is inserted into the hole formed by the key grooves 5A and 5B, the bulge 6C is elastically deformed to apply a spring force to the lateral side of the key hole. By virtue of a frictional resistance caused by this spring force, it is possible to prevent the key 6 from falling off the key hole.

Figure 15:
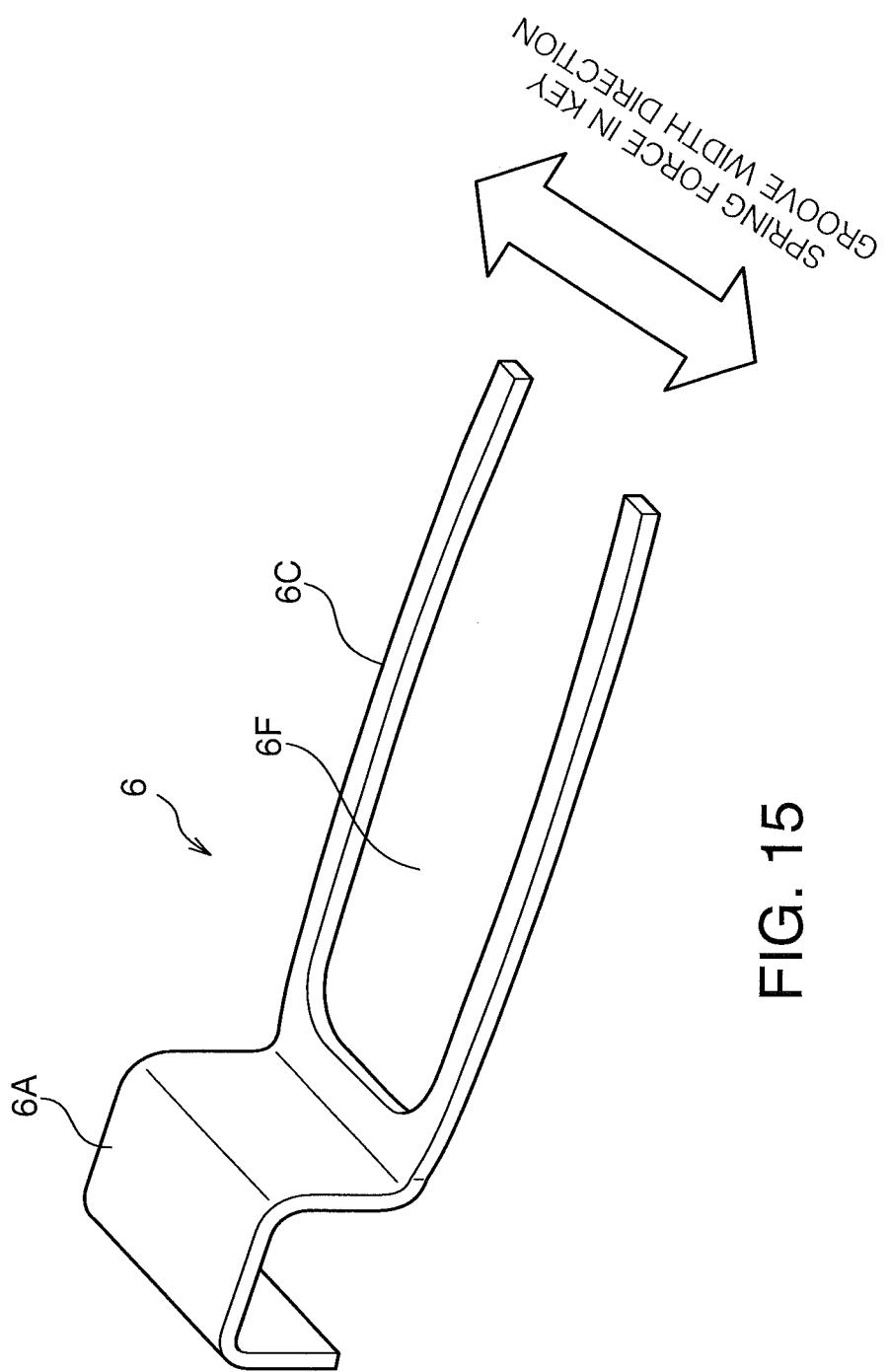
FIG. 15 is a perspective view of a key according to a tenth embodiment of this invention.

Alternatively, according to a tenth embodiment of this invention, as illustrated in FIG. 15, a portion between the slits 16 illustrated in FIGS. 14A and 14B may be further cut out so that a large cut-out portion 6F is formed in the center of the spring portion 6B.

Figure 16:
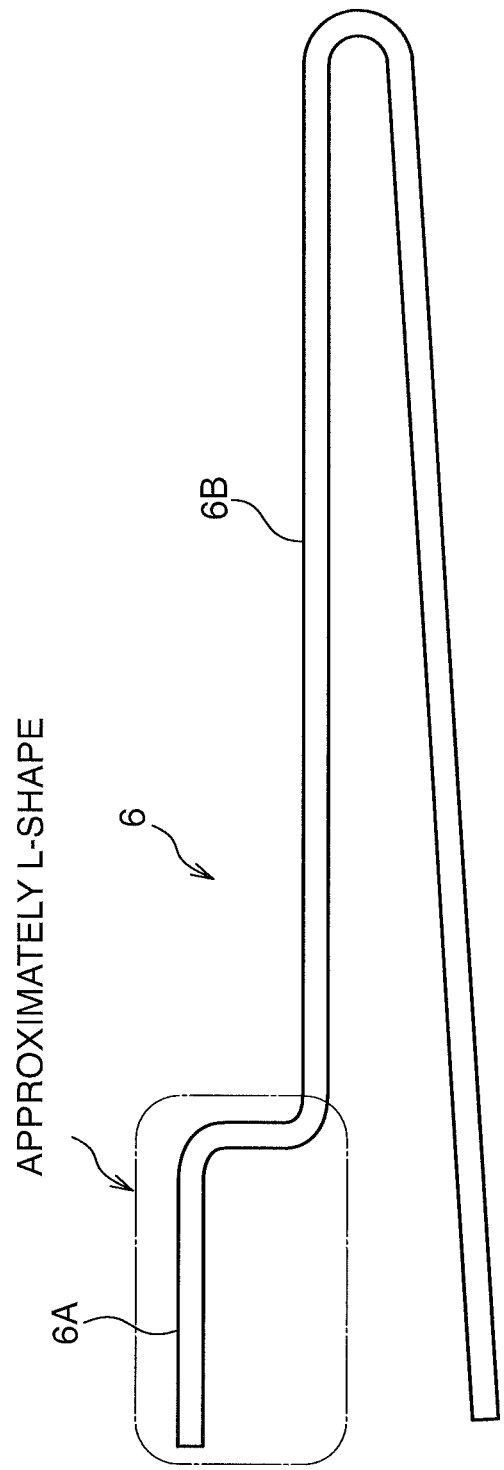
FIG. 16 is a longitudinal sectional view of a key according to an eleventh embodiment of this invention.
Figure 17:
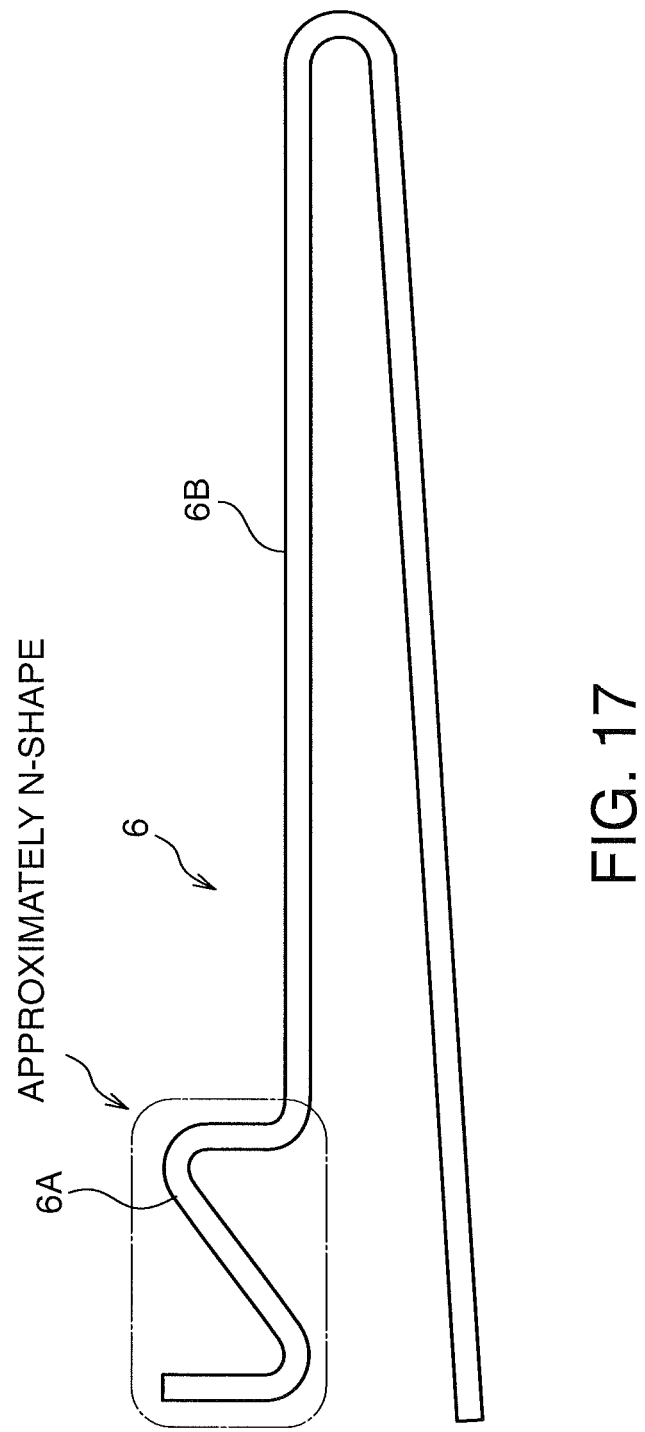
FIG. 17 is a longitudinal sectional view of a key according to a twelfth embodiment of this invention.

Various variations may be possible for the torque support portion 6A of the key 6. That is, as long as a sufficient support force is generated against the shearing force applied to the key 6 by the load that promotes a relative displacement between the stator core 1 and the housing 2 in the rotation direction, the longitudinal sectional shape of the torque support portion 6A may have various shapes such as an L-shape as illustrated in FIG. 16 according to an eleventh embodiment of this invention or an approximately N-shape as illustrated in FIG. 17 according to a twelfth embodiment of this invention.

The contents of Tokugan 2012-40264, with a filing date of Feb. 27, 2012 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

INDUSTRIAL FIELD OF APPLICATION

As described above, according to this invention, it is possible to reduce a stress applied to the key groove by the key used to fix the stator core to the housing. Therefore, it is possible to reinforce a structure of an electric motor/generator used in a vehicle having a dimensional constraint or reduce the dimensions of the electric motor/generator.

The embodiments of this invention in which an exclusive property or privilege is claimed are defined as follows:

1. A locking structure for a stator core that locks the stator core having a circular outer circumference into an inner circumference of a cylindrical housing, the locking structure comprising:
   a first cut-out formed in an outer circumference of the stator core;
   a second cut-out formed in an inner circumference of the housing; and
   a key interposed between the first and second cut-outs, wherein the key comprises a plate spring that applies a spring force to at least one of the first and second cut-outs and has a U-shaped longitudinal cross section.

2. The locking structure according to claim 1, wherein the stator core comprises a stack including a plurality of electromagnetic steel sheets, and the key is inserted into a key hole formed by the first and second cut-outs in a stacking direction of the stack.

3. The locking structure according to claim 1, wherein the key comprises a spring portion serving as the plate spring and a torque support portion supported by the spring portion and arranged across the first and second cut-outs.

4. The locking structure according to claim 3, wherein the stator core comprises a center axis, the first cut-out comprises a first groove formed in the stator core parallel to the center axis, the second cut-out comprises a second groove formed in the housing parallel to the center axis, the first groove is longer than the second groove, the torque support portion is housed in an area where the first and second grooves confront each other, and the spring portion is housed in a hole formed by the first groove and an inner circumferential surface of the housing.

5. The locking structure according to claim 3, wherein the torque support portion comprises a one-side open rectangular shape longitudinal section.

6. The locking structure according to claim 2, wherein the key comprises a spring portion serving as the plate spring and a torque support portion supported by the spring portion and arranged across the first and second cut-outs.

7. The locking structure according to claim 4, wherein the torque support portion comprises a one-side open rectangular shape longitudinal section.

* * * * *